United States Patent
Matthews et al.

[15] 3,643,748
[45] Feb. 22, 1972

[54] PLOW BOTTOM

[72] Inventors: Charles Woodrow Matthews, East Moline; Loren Glenn Arnold, Rock Island, both of Ill.

[73] Assignee: Deere & Company, Moline, Ill.

[22] Filed: July 31, 1969

[21] Appl. No.: 846,527

[52] U.S. Cl. ............................ 172/704, 172/719, 172/764
[51] Int. Cl. ............................................................ A01b 15/00
[58] Field of Search .................. 172/702, 704, 753, 754, 719, 172/769

[56] References Cited

UNITED STATES PATENTS

| | | | |
|---|---|---|---|
| 23,898 | 5/1859 | Bryan | 172/704 X |
| 470,913 | 3/1892 | Flatau | 172/704 |
| 197,494 | 11/1877 | Posey | 172/704 |
| 1,031,641 | 7/1912 | Gieber | 172/704 X |
| 1,669,025 | 5/1928 | Seaholm | 172/754 |
| 3,519,084 | 7/1970 | Fenet | 172/754 |

FOREIGN PATENTS OR APPLICATIONS

| | | |
|---|---|---|
| 496,115 | 1/1950 | Canada |
| 1,500,099 | 9/1967 | France |

*Primary Examiner*—Robert E. Pulfrey
*Assistant Examiner*—Stephen C. Pellegrino
*Attorney*—H. Vincent Harsha, Harold M. Knoth, William A. Murray and John M. Nolan

[57] ABSTRACT

A plow bottom having a reversible landside. The plow bottom includes a frog, a landside mounting plate secured to the frog, and a landside releasably secured to the mounting plate by plow bolts which extend through a pair of apertures provided in the landside and a corresponding pair of apertures provided in the mounting plate. The apertures of each pair are spaced both horizontally and vertically from one another, with the front and rear apertures in the landside positioned equal distances from the front and rear edges, respectively, of the landside and the upper and lower apertures in the landside positioned equal distances from the upper and lower edges, respectively, of the landside.

1 Claim, 4 Drawing Figures

PATENTED FEB 22 1972 3,643,748
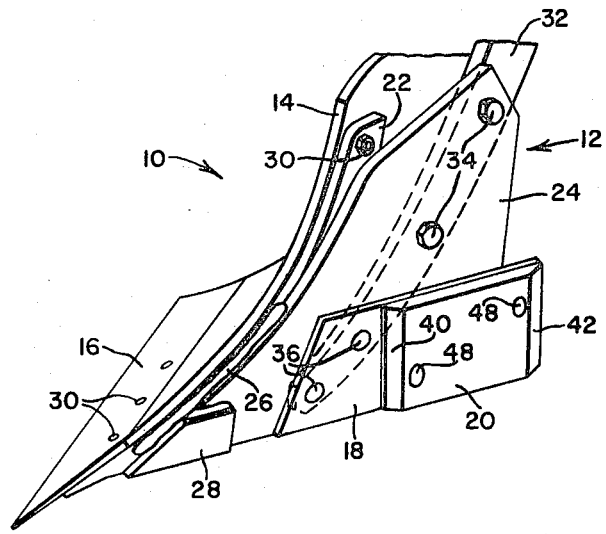
FIG. 1
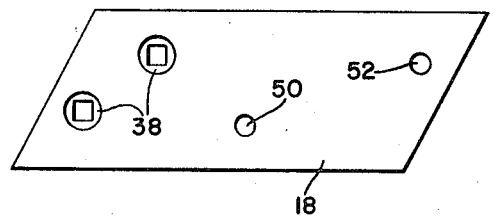
FIG. 2
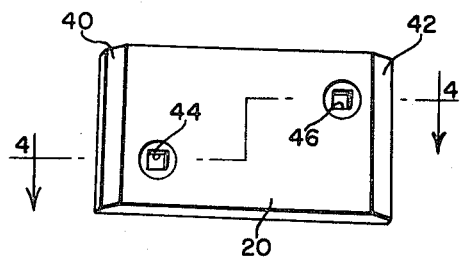
FIG. 3
FIG. 4
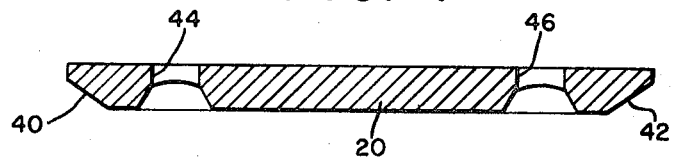
INVENTORS
CHARLES W. MATTHEWS
LOREN G. ARNOLD

PLOW BOTTOM

BACKGROUND OF THE INVENTION

The present invention relates generally to plow bottoms, and more particularly relates to reversible landsides for plow bottoms.

As a plow bottom moves through the earth, the reaction force of the earth against the bottom tends to move the bottom laterally to increase the width of cut of the bottom. To counteract the lateral force placed upon the bottom by the earth, it has been customary to provide a landside on the plow bottom which will slide along and bear against the furrow wall formed by the plow share. The landside bearing against the furrow wall prevents any lateral movement of the plow bottom caused by the reaction forces of the earth on the plow bottom.

After a landside has been used for some time, it wears away due to its sliding action along the furrow wall and eventually has to be replaced if its face is to follow directly behind the leading edge of a plow share. However, due to the fact that the ground in most fields is not packed nearly as hard near the top of the furrow wall as it is near the bottom thereof, the lower portion of the landside absorbs most of the forces and wears away much faster than the upper portion of the landside. However, in all the commercially available landsides known to applicant, it has been necessary to replace the entire landside as soon as one portion had worn. This generally resulted in replacing a landside in which only the lower portion had worn away.

SUMMARY OF THE INVENTION

The object of the present invention is to provide a landside which can be reversed after the lower portion thereof has worn away so that what was previously the upper portion becomes the lower portion and bears against the more firmly packed section of the furrow wall.

An additional object of the present invention is to provide a reversible landside which can be applied to plow bottoms presently in use without any modifications thereof.

Still another object of the present invention is to provide a reversible landside of the type generally described above which is secured to the plow bottom by a pair of plow bolts which extend through a pair of countersunk apertures provided in the landside and in which the apertures are countersunk from a single side so that the landside can be made with a minimum thickness to thereby reduce the cost when eventually replaced.

The above objects and additional objects and advantages will become apparent along with details of construction of a preferred embodiment of the invention from a reading of the following detailed description when taken in conjunction with the accompanying drawing.

BRIEF DESCRIPTION OF THE DRAWING

In the drawing:

FIG. 1 is a perspective view of a plow bottom having a landside constructed in accordance with the principles of the present invention;

FIG. 2 is an elevational view of the landside mounting plate appearing in FIG. 1;

FIG. 3 is an enlarged perspective view of the landside illustrated in FIG. 1; and FIG. 4 is a sectional view taken generally along the line 4—4 of FIG. 3.

DESCRIPTION OF THE PREFERRED EMBODIMENT

Referring to the drawings, the plow bottom indicated generally at 10 includes a frog 12, a moldboard 14, a share 16, a landside mounting plate 18 and a landside 20. The frog 12 comprises a curved moldboard-receiving section 22 and a substantially flat landside-receiving section 24 which are disposed at an acute angle with respect to one another and have their forward edges joined together in any suitable manner such as welding 26 or the like. If desired, the moldboard-receiving section 22 and landside-receiving section 24 of the frog could be formed from a single piece of material which is bent to form the leading edge. The leading edges of the moldboard-receiving section 22 and landside-receiving section 24 extend generally downwardly and forwardly on a curve to form a forwardly disposed toe portion which is reinforced by a plate 28 welded to the landside-receiving section.

The moldboard 14 and share 16 are releasably secured to the moldboard-receiving section 22 in the conventional manner by plow bolts 30.

The plow bottom 10 is secured to a plow frame (undisclosed) by a depending standard 32. The landside-receiving section 24 of the frog 12 is releasably secured to the standard 32 by a pair of upper bolts 34 and a pair of lower plow bolts 36.

The landside mounting plate 18 is also secured to the landside-receiving section 24 of the frog 12 by the plow bolts 36, and to this end is provided with a pair of forward horizontally and vertically spaced apertures 38. The apertures 38 are square and provided with circular countersinks so as to conform to the head of conventional plow bolts 36. The plow bolts 36 extend through the apertures 38 provided in the mounting plate 18 and also through suitable apertures provided in the landside-receiving section 24 and the lower end of standard 32.

The mounting plate 18 takes the shape of a parallelogram having a pair of acute angles so that the leading edge thereof extends generally upwardly and rearwardly to conform generally to the curvature of the leading edge of the landside-receiving section 24. The trailing edge of the mounting plate 18 is also inclined upwardly and rearwardly so that when stamping mounting plates from a long strip of metal, only one cut is necessary to form each plate. This not only simplifies the manufacturing operation, but also reduces the material needed in the rearward portion of the mounting plate 18.

The landside 20 is generally of rectangular shape, has its front and rear edges beveled inwardly as at 40 and 42 toward the mounting plate 18, and is provided with a pair of mounting apertures 44 and 46. The apertures 44 and 46 are square and provided with circular countersinks to conform to the head of conventional plow bolts, and are also both horizontally and vertically spaced from each other. The spacing of the apertures 44 and 46 are such that they are positioned equal distances from the front and rear edges, respectively, of the landside and also equal distances from the lower and upper edges, respectively, of the landside. The landside 20 is releasably secured to the mounting plate 18 by a pair of plow bolts 48 which extend through the apertures 44 and 46 provided in the landside 20 and a pair of apertures 50 and 52 provided in the mounting plate 18 and positioned to correspond to the apertures 44 and 46 respectively.

It should be noted that the aperture 50 in mounting plate 18 is so positioned that a corresponding aperture must be provided in the landside receiving section 24 of frog 12 so as to receive the lower plow bottle 48. The other aperture 52 is provided in a portion of the mounting plate 18 which extends to the rear of the landside-receiving section 24 so that it is not necessary to provide an aperture in the landside-receiving section 24 for the rear plow bolt 48. The three apertures provided in the landside-receiving section 24 of the frog 12 for receiving the plow bolts 36 and the forward plow bolt 48 are the apertures normally provided for mounting conventional landsides which are presently commercially available. Thus, the mounting plate 18 and landside 20 can be mounted on presently available plow bottoms without any modification of the plow bottom.

After the landside 20 has been used for some time and its lower portion has been worn away, the landside 20 can be reversed by removing the plow bolts 48, rotating the landside 20 end for end and in the same plane, and replacing the plow bolts 48 to secure the landside 20 in its reversed condition to the mounting plate 18. When reversing the landside 20, it is necessary that the same side of the landside faces the furrow wall since only one side of the apertures 44 and 46 are countersunk to receive the heads of the conventional plow bolts 48. By countersinking the apertures 44 and 46 from only one direction, it is possible to make the landside 20 only thick enough to provide sufficient strength to prevent the heads of the plow bolts 48 from pulling through. Thus, the landsides can be made thinner which results in a savings of material and money when replacement is eventually required. The mounting plate 18 is made of a thickness to make up for the material omitted from the landside 20 so that the combined thickness of the mounting plate 18 and landside 20 will equal the thickness of the conventional landsides which are presently commercially available.

From the foregoing it can be seen that the present invention provides a reversible landside which substantially doubles the life of the conventional landside, which will be cheaper to replace than the conventional landside, and can be used on plows which were originally equipped with conventional landsides.

While only a single preferred embodiment of the invention has been described and illustrated, various modifications thereof will become apparent to those skilled in the art and can be made without departing from the underlying principles of the invention.

We claim:

1. A plow bottom comprising: a frog including a moldboard section and a landside section disposed at an acute angle with respect to one another and having forward edges which extend downwardly and forwardly to form a toe portion; a moldboard and share secured to the mOldboard section of the frog and having leading edges positioned laterally beyond the landside section; a mounting standard and an elongated landside mounting plate secured directly to the landside section on opposite sides thereof by common fastener means; a generally rectangular-shaped and planar landside having first and second spaced apertures positioned equal distances from the front and rear edges, respectively, and top and bottom edges respectively, of the landside; the first and second apertures being spaced both vertically and horizontally from each other and being countersunk from a single side; a pair of apertures provided in the elongated landside mounting plate and being spaced to conform to the first and second apertures provided in the landside; plow bolts extending through the apertures to releasably secure the landside to the elongated landside mounting plate; the elongated landside mounting plate and landside having a combined thickness substantially equal to the distance which the leading edges of the moldboard and share are positioned laterally beyond the landside section.

* * * * *